United States Patent [19]
Affa

[11] Patent Number: 4,999,623
[45] Date of Patent: Mar. 12, 1991

[54] POSITION MEASURING APPARATUS WITH REFERENCE MARKS

[75] Inventor: Alfred Affa, Stein/Traun, Fed. Rep. of Germany

[73] Assignee: Dr. Johannes Heidenhain GmbH, Traunreut, Fed. Rep. of Germany

[21] Appl. No.: 517,942

[22] Filed: May 2, 1990

[30] Foreign Application Priority Data

May 5, 1989 [DE] Fed. Rep. of Germany ....... 3914739

[51] Int. Cl.$^5$ .......................... H03M 1/22; H03M 1/30
[52] U.S. Cl. ......................................... 341/13; 341/11; 250/237 G
[58] Field of Search ...................... 341/3, 4, 6, 7, 8, 9, 341/10, 11, 13, 14, 15; 250/237 G, 231.14; 356/375, 383; 33/707

[56] References Cited

U.S. PATENT DOCUMENTS

| | | | |
|---|---|---|---|
| 3,982,106 | 9/1976 | Stutz | 250/237 G X |
| 4,101,764 | 7/1978 | Nelle | 250/237 G |
| 4,117,320 | 9/1978 | Tomlinson et al. | 250/237 G |
| 4,330,831 | 5/1982 | Schwefel | 364/474.18 |
| 4,363,964 | 12/1982 | Schmitt | 250/237 G |
| 4,423,958 | 1/1984 | Schmitt | 356/375 X |
| 4,459,750 | 7/1984 | Affa | 250/237 G X |
| 4,462,159 | 7/1984 | Nelle | 250/237 G X |
| 4,479,716 | 10/1984 | Nelle | 250/237 G |
| 4,491,928 | 1/1985 | Reichl | 250/237 G |
| 4,519,140 | 5/1985 | Schmitt | 250/237 G X |

*Primary Examiner*—William M. Shoop, Jr.
*Assistant Examiner*—Howard L. Williams
*Attorney, Agent, or Firm*—Willian Brinks Olds Hofer Gilson & Lione

[57] ABSTRACT

A position measuring apparatus of the type that includes a measuring scale and a scanning unit is provided. The measuring scale includes a measuring graduation track and a reference mark track associated with the measuring graduation track. The reference mark track includes a plurality of reference marks, a predetermined number of which are further designated as marked or unmarked. The scanning unit provides for scanning the measuring scale and evaluating the signal produced by such scanning. The apparatus also includes an operating switch associated with the scanning unit. The operating switch provides for selection of at least two modes of operation of the scanning unit: a first mode in which all the reference marks on the reference mark track are evaluated, and a second mode in which marked or unmarked reference marks on the reference track are evaluated.

15 Claims, 3 Drawing Sheets

Fig. 2A  Fig. 2B  Fig. 2  Fig. 2C  Fig. 2D  Fig. 2E  Fig. 2F

POSITION MEASURING APPARATUS WITH REFERENCE MARKS

BACKGROUND OF THE INVENTION

This invention relates to a length measuring apparatus of the type having a measuring grid scale, a plurality of reference marks positioned in association with the measuring grid scale and a scanning unit for sensing the grid scale and reference marks and generating an output signal in response thereto.

An apparatus of this type is used for example in conjunction with a tool and workpiece where it is required to measure the relative or absolute position or change of position of one with respect to the other. In such a usage, the scanning unit is typically connected to the tool and the grid scale is connected to the workpiece.

An example of this type of apparatus is described in U.S. Pat. No. 4,491,928 (corresponding to German patent DE 30 39 483 C2). In that patent, a position measuring apparatus is described having coded markings (eg. $C_1$, $C_2$, $C_3$, $C_4$ ...) allocated to the individual reference marks (N). By input of the corresponding code into a computer or comparator (R), any arbitrary reference mark (N) can be selected and located and the scanning unit can be positioned over the correspondingly-coded reference mark. Moreover, the coded marking may also include information to enable the determination of the absolute position of the reference mark (N) with respect to a reference point.

If the absolute position of the selected reference mark is not needed for a particular usage, the selection of individual reference marks can be made by means of optical or magnetic switching elements. An example of such an incremental length position measuring apparatus that provides for the determination of the relative position of two objects by means of such switching elements (e.g. magnet 9) is described in U.S. Pat. No. 4,101,764 (corresponding to German patent DE 25 40 412-C3).

Still another position measuring apparatus is described in U.S. Pat. No. 3,982,106 (corresponding to German patent DE 24 16 212-C3). In this patent, the reference marks are uniquely identifiable (or coded) by their spacings apart. Thus, by an evaluation of these spacings, the absolute position of any of the reference marks—with respect to a reference point of the apparatus—can be determined.

Users of such position measuring devices such as machine tool manufacturers, have different requirements especially relating to the various dimensions and ranges of dimensions of the tools and workpieces for which an apparatus of this type may be used. Accordingly, in order to meet these various requirements, manufacturers of position measuring devices have had to provide measuring scales of various dimensions to accommodate these needs. For the manufacturer, this requires the production and stocking of various sizes and types of position measuring components adapted for the specific and various needs of the different users of such devices. This is undesirable due to the relatively high cost of such production and storage.

Accordingly, it is an object of the present invention to provide a position measuring apparatus that is adaptable to the requirements of various users yet minimizes the production of a multiplicity of components.

It is a further object of the present invention to provide a position measuring apparatus that can accommodate various users by a standardization of specialized and expensive components.

SUMMARY OF THE INVENTION

To achieve the foregoing and other objectives, the present invention provides a position measuring apparatus of the type that includes a measuring scale and a scanning unit. The measuring scale includes a measuring graduation track and a reference mark track associated therewith. The scanning unit provides for scanning the measuring scale and evaluating the signal produced by such scanning. The apparatus also includes an operating switch associated with the scanning unit. The operating switch provides for selection of at least two modes of operation of the scanning unit, a first mode in which all the reference marks on the reference mark track are evaluated, and a second mode in which marked or unmarked reference marks on the reference track are evaluated.

DETAILED DESCRIPTION OF THE PRESENTLY PREFERRED EMBODIMENTS

Figures 1, 1E:
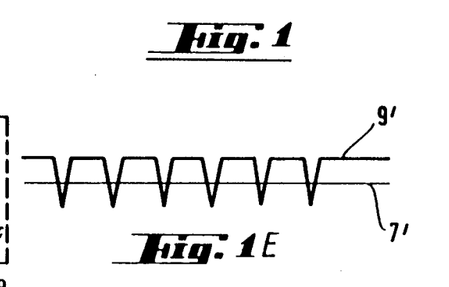
FIG. 1E a scanning signal diagram of the photodetectors depicted in FIG. 1D.
Figure 1A:
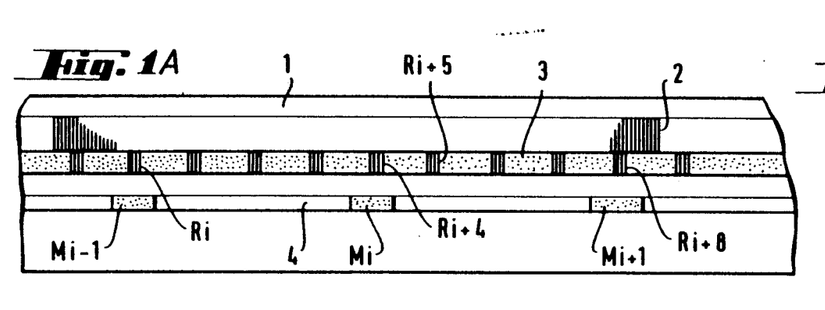
FIG. 1A shows a measuring scale of a first preferred embodiment of this invention.
Figure 1B:
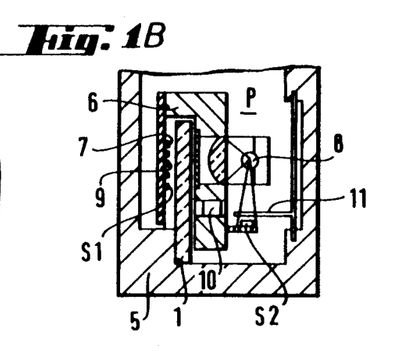
FIG. 1B is a sectional view of the first embodiment of this invention.
Figure 1C:
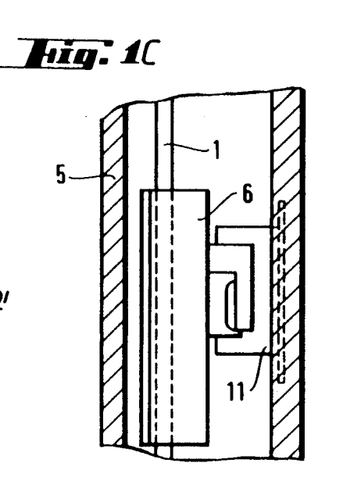
FIG. 1C a bottom view of the embodiment of FIG. 1B.

FIG. 1 depicts generally a first embodiment of the present invention. A photoelectric length measuring apparatus is denoted generally by the numeral P (FIG.

1B). This embodiment includes a measuring scale 1, a portion of which is shown in FIG. 1A. The measuring scale 1 includes several parallel tracks, 2, 3, and 4. One of these tracks comprises a measuring graduation 2 which may be in the form of a line grid. A second track 3 referred to herein as the reference mark track, includes a series of coded reference marks Ri (i = 1, 2, 3, ... n) which are arranged or positioned in a certain regular (but preferably not equal) spacing apart. The spacings of the reference marks Ri thus form a certain raster, or raster-like pattern or period. A third track 4' referred to as the sWitching track, includes markings Mi (i — 1, 2, 3, ... n). which are also arranged or positioned in a certain regular spacing apart. The spacing of markings Mi differs from that of the spacing of the reference marks Ri of reference mark track 3. Preferably, the spacing of the markings Mi is a multiple of the spacings of the reference marks Ri and like the reference marks Ri of the reference mark track 3, the markings Mi of switching track 4 may also form a raster (or raster-like pattern or period) different however from that of reference mark track 3.

In the first preferred embodiment the line grid that forms the measuring graduation 2 is constructed of alternating opaque lines and translucent gaps of equal width. In this first preferred embodiment, the line grid has a graduation period of 20. Also, in the first preferred embodiment, the spacing of the reference marks Ri in the track 3 is not constant but rather differs in a known, defined manner. Thus, by counting the measuring steps (i.e. increments) of the measuring graduation 2 from one reference mark Ri to the next Ri+1, the reference mark can be uniquely identified thereby enabling the determination of the absolute position of the scale 1. Further, in a preferred embodiment, although the spacings between each pair of reference marks differs, adjacent spacings add up to a known constant. A suitable constant used in this disclosed embodiment is 20 mm. Thus, although the spacings between reference marks are not equal, a reference mark Ri is spaced approximately every 10 mm in the reference mark track 3.

The switching track 4 has markings Mi that have a greater distance apart from one another than the reference marks Ri of reference mark track 3. In this embodiment, the switching marks are positioned every four reference marks apart. Preferably the markings Mi of switching track 4 as well as the measuring graduation 2 and the reference marks Ri of the reference mark track 3 are applied to the measuring scale 1 during the manufacture thereof.

FIG. 1B shows a sectional view of this first embodiment of the position measuring apparatus P. The measuring scale 1 is positioned and arranged so that it is protected in the interior of a casing 5. The tracks 2, 3, and 4 (as depicted in FIG. 1A) are photoelectrically scanned by a scanning unit 6. The scanning unit 6 may be of a type that is well known in the art. The scanning unit 6 includes an illumination means, such as a lamp 8.

The scanning unit 6 also includes a first photodetector 7 having an output voltage that is a function of the illumination from the lamp 8. The output voltage of the photodetector 7 is utilized as a trigger threshold for the scanning of the reference marks. Accordingly, this output may be considered the push-pull voltage and the photodetector 7 therefore may be considered the reference mark push-pull photodetector. A second photodetector (also referred to herein as the reference mark photodetector) scans the reference marks Ri in reference mark track 3. Additional photodetectors, referred to herein as switching photodetectors S1 and S2, are also included as part of the scanning unit 6 and have a use and function as explained below.

Figure 1D:
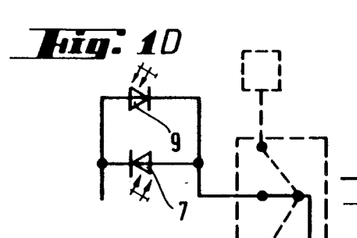
FIG. 1D is a schematic of a first arrangement of photodetectors of the embodiment of FIG. 1B.

As shown in FIG. 1D, the reference mark photodetector 9 and the reference mark push-pull photodetector 7 are arranged in an antiparallel-switched configuration, i.e. parallel but in the opposite direction. Both are illuminated by the lamp 8. In operation, when there is relative displacement between the scanning unit 6 and the measuring scale 1, the photodetectors 7 and 8 produce a signal output graphically represented in the diagram of FIG. 1E. The horizontal line 7' represents the level of the trigger threshold voltage which is output by the photodetector 7. The reference mark photodetector 9 produces an output graphically represented by the line 9' as a result of scanning the reference marks Ri (which in this embodiment is approximately every 10 mm). As noted above by counting the increments between pulses produced by the reference mark photodetector 9, the absolute position of the scale 1 can be determined. As so far described, all the reference marks Ri are evaluated.

Figure 1F:
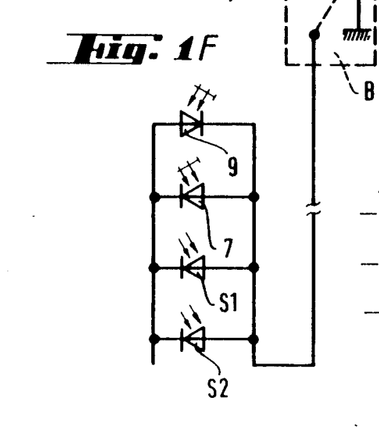
FIG. 1F is a schematic of another arrangement of photodetectors of the embodiment of FIG. 1B.
Figure 1G:
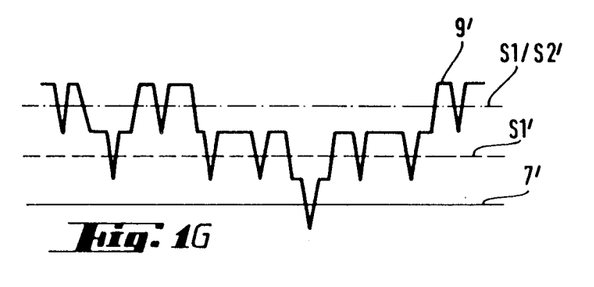
FIG. 1G a scanning signal diagram of the photodetectors depicted in FIG. 1F.

FIGS. 1F and 1G show another mode of operation. As mentioned above, in addition to the photodetectors 7 and 9. (which may be identical to those of FIG. 1D). the scanning unit 6 further includes switching photodetectors S1 and S2. These photodetectors S1 and S2 are parallel to photodetectors 7 and 9. The switching photodetectors S1 and S2 are activated and/or operated by an operating switch B associated with the scanning unit 6. The operating switch B may be provided as a standard component internal to the scanning unit 6. However, the function of the switching of the photodetectors S1 and S2 can likewise be accomplished by actually rewiring the scanning unit to deactivate the photodetectors or by an external switching command. These alternative methods and equivalents thereof for providing the activation and deactivation of the switching photodetectors are considered to be contemplated within the scope of the present invention wherein by means of the activation of the switching photodetectors different combinations of reference marks can be evaluated.

The switching photodetectors S1 and S2 function to raise the trigger level 9'. In one embodiment an additional lamp 10 illuminates the switching photodetector S1, thereby raising the trigger threshold level as indicated by the broken horizontal line in FIG. 1G. In an alternative embodiment, the switching photodetector S1 can be illuminated by the lamp 8. In this alternative embodiment, lamp 8 also illuminates the switching photodetector S2 which again raises the trigger level as indicated by the dot-and-dashed horizontal line of FIG. 1G. The level of the trigger threshold voltage 7' required for the evaluation of a reference mark Ri remains preserved, however, by the voltage of the reference mark push-pull photodetector 7, as indicated by the continuous horizontal line of FIG. 1G.

Reference mark pulses above this level 7' are not evaluated. In order for a pulse to reach down to this level, a selection element such as an occluding screen or shutter 11 is provided. The occluding screen 11 is slidably positioned in the casing 5 of the measuring apparatus P as shown in FIG. 1B. Such occluding screens are known in the art. Accordingly the measuring apparatus P can be readily configured to allow for designation of a selection of several reference marks, Rk, from the series of all the reference marks. Ri. Selection can be made provided as follows.

Each reference mark Ri generates a reference pulse. However, each of such reference pulses is not necessarily evaluated because illumination of photodetectors 7, S1, and S2, raises the trigger level too high. The switching track 4 parallel to the reference mark track 3 includes switching marks Mi. In this embodiment the switching marks Mi−1, Mi, Mi+1 are arranged in the switching track 4 parallel and corresponding to the reference marks Ri, Ri+4, Ri+8, etc. (The present invention is not limited to a specific arrangement of multiples and other multiples or correspondences can be utilized according to the design of the apparatus). When a switching mark Mi is scanned, the trigger level falls, since the corresponding switching photodetector S1 is darkened. However, the reference pulse still is not evaluated since the trigger threshold (7') is not yet reached.

The occluding screen 11 can be associated with one of the markings (or several screens to several markings) Mi. Then, when that particular marking is scanned, the corresponding switching photodetector S2 associated with it is not illuminated (i.e. becomes darkened) due to the screen. When this occurs, the trigger level falls far enough that the reference pulse (e.g. Ri+8) falls below the trigger threshold 7' and is evaluated.

This operation may appear at first complicated, since it would appear that occluding screens or other selection elements could be associated directly with individual reference marks Ri as is known in the art. However, this is not readily accomplished if the reference marks are distance-coded. The distance-coding of the reference marks is dictated as part of the manufacture of the measuring scale. Occluding screens, magnetic switches, or other selection elements, by reason of their construction, are difficult to associate selectively to individual reference marks, especially if such reference marks are distance-coded. For this reason, in the manufacture of the measuring scale 1, the marks Mi on the switching track 4 can be associated with certain of the reference marks Ri so that later, certain of the reference marks can readily be selected by means of occluding screens, shutters, magnetic switches, or the like. In this manner, a measuring scale 1 can be constructed that can be used in a manner in which all the distance-coded reference marks Ri are evaluated, or in which only reference marks of another period (of raster) are evaluated, for example Ri+4.

Furthermore, it is possible to proceed from the reference marks with the raster or spacing of Ri+4, (which corresponds to the raster of the markings Mi) to make a additional selections. To the user, this has the advantage that at least three different possible selections of reference marks can be provided in a single measuring scale. To the manufacturer, this has the advantage of decreasing the costs of manufacturing and stocking additional scales.

Figures 2, 2D:
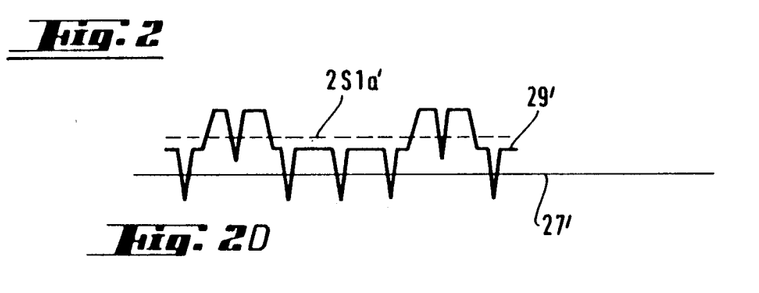
FIG. 2D a scanning signal diagram of the photodetectors depicted in FIG. 2E.
Figure 2A:
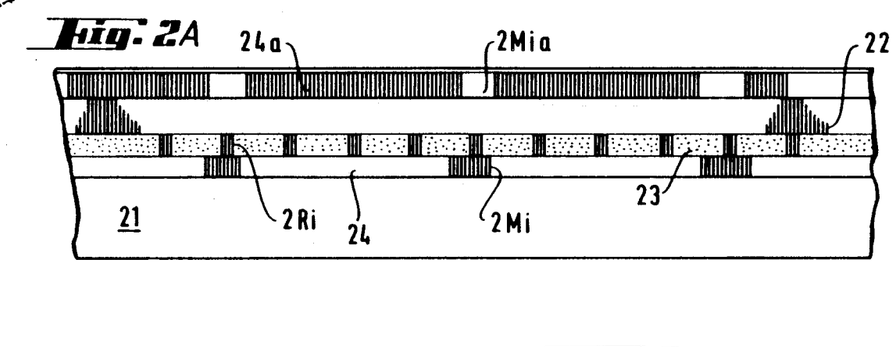
FIG. 2A shows a measuring scale of a second preferred embodiment of this invention.
Figure 2B:
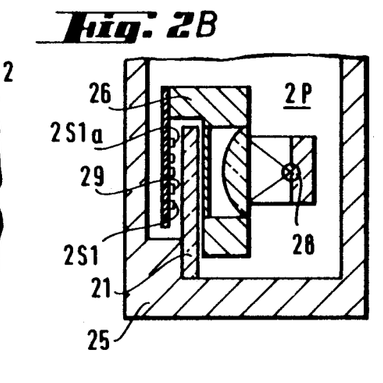
FIG. 2B is a sectional view of the second embodiment of this invention.
Figure 2C:
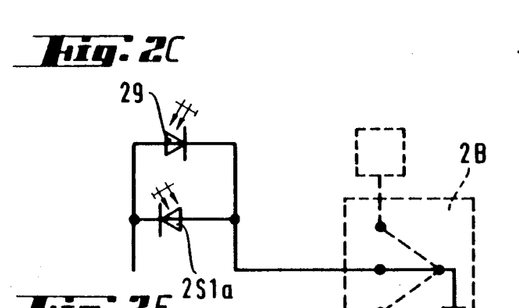
FIG. 2C is a schematic of a first arrangement of photodetectors of the embodiment of FIG. 2B.
Figure 2E:
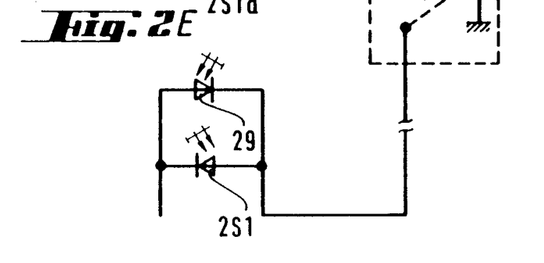
FIG. 2E is a schematic of another arrangement of photodetectors of the embodiment of FIG. 2B.

FIGS. 2 and 3 depict second and third preferred embodiments of the position measuring apparatus, i.e. 2P and 3P, respectively. For the sake of clarity, except as indicated below, the components and functions of the embodiments of FIGS. 2 and 3 are similar to those of FIG. 1 and for a description of such components, reference may be made to the analogous component of FIG. 1. Analogous components bear the reference numbers used in FIG. 1, to which are prefixed the numeral "2" or "3", respectively.

Figure 2F:
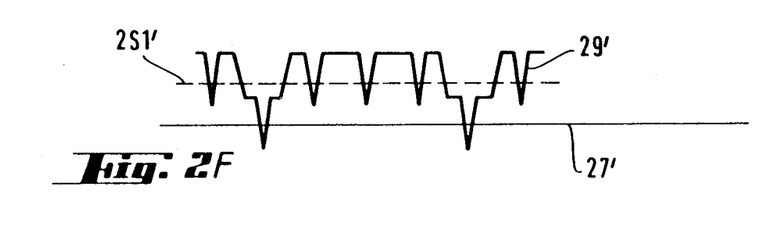
FIG. 2F a scanning signal diagram of the photodetectors depicted in FIG. 2E.
Figure 3A:
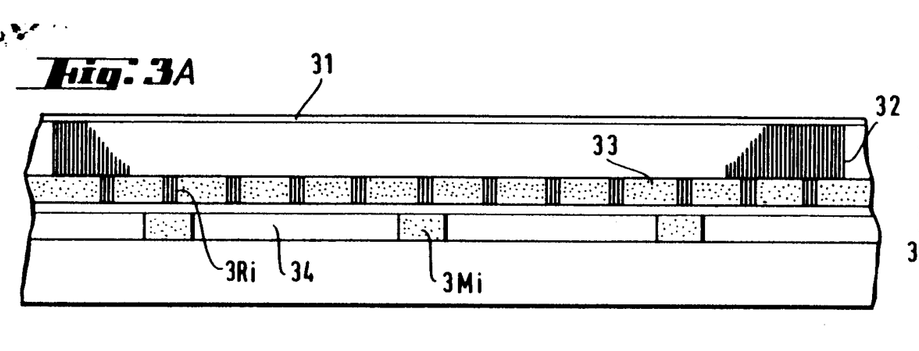
FIG. 3A shows a measuring scale of a third preferred embodiment ,of this invention.
Figure 3B:
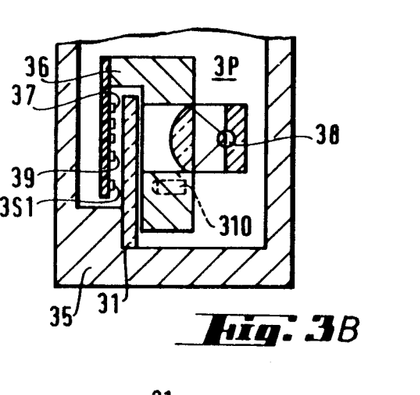
FIG. 3B is a sectional view of the third embodiment of this invention.
Figure 3C:
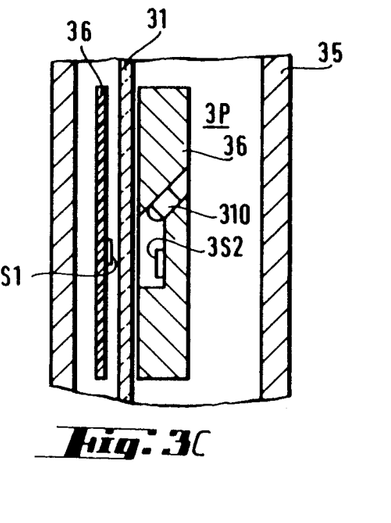
FIG. 3C a bottom view of the embodiment of FIG. 3B.
Figures 3D, 3F:
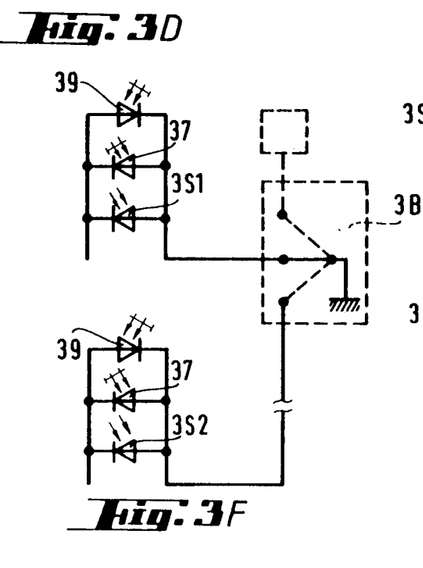
FIG. 3D is a schematic of a first arrangement of photodetectors of the embodiment of FIG. 3B.
FIG. 3F is a schematic of another arrangement of photodetectors of the embodiment of FIG. 3B.
Figure 3E:
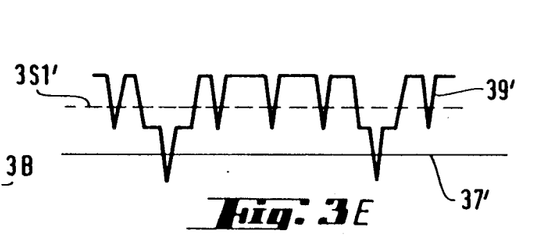
FIG. 3E a scanning signal diagram of the photodetectors depicted in FIG. 3D.
Figure 3G:
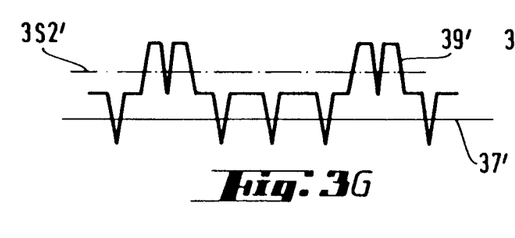
FIG. 3G a scanning signal diagram of the photodetectors of depicted in FIG. 3F.

Referring to FIG. 2, in the second preferred embodiment, a measuring scale 21 includes a primary switching track 24 and a secondary switching track 24a. The primary switching track 24 includes switching markings 2Mi which are opaque (or at least relatively opaque compared to the zones between switching marking 2Mi) which thereby serve to darken the switching photodetector 2S1 associated therewith during scanning. In contrast thereto the secondary switching track 24a includes transparent (or at least translucent) markings 2Mia separated by opaque zones between the markings 2Mia. Thus, the associated switching photodetector 2S1a is not illuminated except during the scanning of the markings 2Mi. The secondary switching track 24a is thus the complement of the primary switching track 24. According to the mode of selection of the operating switch 2B. signal diagrams,. such as are shown in FIGS. 2D and 2F, will be produced as output.

It is evident that with this embodiment, as in the first embodiment a selection element, such as an occluding screen or the like may be used to select certain of the reference marks 2Ri. Likewise, as in the embodiment of FIG. 1, it is also possible to choose a mode of operation in which all the reference marks 2Ri are evaluated.

FIG. 3 depicts a third preferred embodiment of the position measuring apparatus 3P. The position measuring apparatus 3P is similar in some respects to that of FIG. 2. The position measuring apparatus 3P includes a switching track 34. The switching track 34 is constructed in such a way that the markings 3Mi are reflecting and the spaces between the marking 3Mi are translucent (i.e. permeable to light). A switching photodetector 3S1 associated with the translucent areas of the switching track 34 is located on the side of measuring scale 31 opposite the lamp 38. Associated with the reflecting markings 3Mi is a switching photodetector 3S2 located on the same side of the measurement scale 31 as the lamp 38. (Alternatively, a separate illumination means in the form of a light-emitting diode 310 may be provided). An operating switch 3B provides for the selection of the mode of operation. Signals are generated such as graphically represented in the diagrams of FIG. 3E or 3G.

As in the other previously described embodiments, the mode of operation can be readily selected by the operating switch, 3B. One or more occluding screens (not depicted) may be used to provide a selection of modes of operation including a mode in which all of the reference marks are evaluated.

With respect to each of the above described embodiments, a mode of operation can also be selected in which none of the reference marks are evaluated.

The present invention can be used with position measuring apparatus both of the type in which the absolute position can be determined (such as through distance-coded reference marks) and of the type in which only the relative (incremental) position is determined.

The present invention provides the special advantage that the measuring scale may be manufactured to already contain all the information necessary for differing types of reference mark evaluation. Further, through the expedient of an operating switch, selection of the type of reference mark evaluation can readily be made. This means that uniform standardized measuring scales can be manufactured and installed, and that at a later point of time, a selection can readily be made to determine a mode of operation in which all the reference marks are evaluated, or some other combination of reference marks are evaluated.

It is intended that the foregoing description be regarded as illustrative rather than limiting, and that it be understood that it is the following claims, including all equivalents, which are intended to define the scope of the invention.

What is claimed is:

1. In a position measuring apparatus of the type that includes a measuring scale having a measuring graduation track and a reference mark track having a plurality of reference marks which can be selectably designated as marked or unmarked associated therewith and a scanning unit having a means for scanning and evaluating the tracks on the measuring scale, an improvement comprising:
   an operating switch associated with the scanning unit, said operating switch capable of providing selection of one of at least two modes of operation of the scanning unit, the at least two modes including:
   a first mode in which all the reference marks on the reference mark track are evaluated and
   a second mode in which marked or unmarked reference marks on said reference track are evaluated.

2. The position measuring apparatus of claim 1 in which said measuring scale further includes switching markings associated with certain reference marks on the reference track, said reference markings selectable by selection elements that can be associated with said measuring scale.

3. The position measuring apparatus of claim 1 further comprising a switching track having switching markings, said switching track parallel to the measuring graduation track.

4. The position measuring apparatus of claim 3 in which said switching markings comprise opaque zones on said switching track and further in which said switching track further comprises transparent zones between said opaque zones.

5. The position measuring apparatus of claim 3 in which said switching markings comprise reflecting zones on said switching track and further in which said switching track further comprises transparent zones between said reflecting zones.

6. A position measuring apparatus comprising:
   a measuring scale including a measuring graduation track and a reference mark track associated with the measuring graduation track having a plurality of reference marks;
   a scanning unit for scanning and evaluating the tracks on said measuring scale;
   one or more switching markings associated with reference marks on said reference mark track; and
   an operating switch associated with said scanning unit, said operating switch capable of providing selection of one of at least two modes of operation of said scanning unit, the at least two modes including:
   a first mode in which all the reference marks on said reference mark track are evaluated, and
   a second mode in which evaluation of the reference marks on said reference mark track is modified based upon sensing by said scanning unit of said switching markings.

7. The position measuring apparatus of claim 6 further comprising:
   one or more selection elements capable of connection to said measuring scale and association with one or more of said switching markings, said selection elements operable to provide for a mode of operation of said apparatus.

8. The position measuring apparatus of claim 6 in which said switching markings are located on a switching track, said switching track parallel to said measuring graduation track.

9. The position measuring apparatus of claim 8 in which said switching markings comprise opaque zones on said switching track and further in which said switching track further comprises transparent zones between said opaque zones.

10. The position measuring apparatus of claim 9 in which said switching markings comprise reflecting zones on said switching track and further in which said switching track further comprises transparent zones between said reflecting zones.

11. In a position measuring apparatus of the type that includes a measuring scale having a measuring graduation track and a reference mark track associated therewith and a scanning unit having a means for scanning and evaluating the tracks on the measuring, an improvement comprising:
   a switching marking associated with at least one reference mark on the reference mark track
   a means for precluding the scanning unit from evaluating selected reference marks on the reference mark track, said precluding means responsive to the scanning of said switching marking by the scanning
   an operative switch associated with the scanning unit, said operating switch capable of deactivating said precluding means to provide another mode of operation in which all the reference marks on the reference mark track are evaluated.

12. The position measuring apparatus of claim 11 in which said measuring scale further includes switching markings associated with certain reference marks on the reference track, said switching markings selectable by selection elements that can be associated with said measuring scale.

13. The position measuring apparatus of claim 12 in which said switching markings are arranged on a switching track parallel to the measuring graduation track.

14. The position measuring apparatus of claim 13 in which said switching markings comprise opaque zones on said switching track and further in which said switching track further comprises transparent zones between said opaque zones.

15. The position measuring apparatus of claim 13 in which said switching markings comprise reflecting zones on said switching track and further in which said switching track further comprises transparent zones between said reflecting zones.

* * * * *

UNITED STATES PATENT AND TRADEMARK OFFICE
CERTIFICATE OF CORRECTION

PATENT NO. : 4,999,623
DATED : March 12, 1991
INVENTOR(S) : Alfred Affa It is certified that error appears in the above-identified patent and that said Letters Patent is hereby corrected as shown below:

IN THE BACKGROUND OF THE INVENTION

In column 1, line 19, please delete "4 491 928" and substitute therefor --4,491,928--.

In column 1, line 24, after "(R), please delete "." and substitute therefor --,--.

In column 1, line 49, after "devices" please insert --,--.

IN THE BRIEF DESCRIPTION OF THE DRAWINGS

In column 2, line 26, after "1C" please insert --is--.

In column 2, line 50, after "embodiment" please delete ",".

IN THE DETAILED DESCRIPTION OF THE
PRESENTLY PREFERRED EMBODIMENTS

In column 3, line 6, after "3" please insert --,--.

In column 3, line 11, please delete "4'" and substitute therefor --4,--.

UNITED STATES PATENT AND TRADEMARK OFFICE
CERTIFICATE OF CORRECTION

PATENT NO. : 4,999,623

DATED : March 12, 1991

INVENTOR(S) : Alfred Affa

It is certified that error appears in the above-identified patent and that said Letters Patent is hereby corrected as shown below:

In column 3, line 12, please delete "Witching" and substitute therefor --witching--.

In column 3, line 13, after "... n)" please delete --.-- and substitute therefor --,--.

In column 3, line 23, after "grid" please insert --,--.

In column 4, line 19, after "above" please insert --,--.

In column 4, line 26, after "9" please delete "." and substitute therefor --.--; and after "1D)" please delete "." and substitute therefor --,--.

In column 4, line 66, after "Accordingly" please insert --,--.

In column 5, line 1, after "Ri" please delete "." and substitute therefor --,--.

In column 5, line 2, after "follows" please delete "." and substitute therefor --:--.

In column 5, line 52, after "make" please delete "a".

UNITED STATES PATENT AND TRADEMARK OFFICE
CERTIFICATE OF CORRECTION

PATENT NO. : 4,999,623

DATED : March 12, 1991

INVENTOR(S) : Alfred Affa

It is certified that error appears in the above-identified patent and that said Letters Patent is hereby corrected as shown below:

In column 6, line 9, after "thereto" please insert --,--.

In column 6, line 12, after "Thus," please delete ".".

In column 6, line 21, after "like" please insert --,--.

In column 6, line 65, after "uniform" please insert --,--.

IN THE CLAIMS

In claim 1, line 14, after "evaluated" please insert --,--.

In claim 6, line 7, after "scale" please delete ":" and substitute therefor --;--.

UNITED STATES PATENT AND TRADEMARK OFFICE
CERTIFICATE OF CORRECTION

PATENT NO. : 4,999,623

DATED : March 12, 1991

INVENTOR(S) : Alfred Affa

It is certified that error appears in the above-identified patent and that said Letters Patent is hereby corrected as shown below:

In claim 11, lines 12 and 13, after "scanning" please insert --unit--; and line 14, please delete "operative" and substitute therefor --operating--.

Signed and Sealed this

Twenty-fifth Day of August, 1992

Attest:

DOUGLAS B. COMER

*Attesting Officer*       *Acting Commissioner of Patents and Trademarks*